May 7, 1963  J. MUHR  3,088,475
CAMPING DEVICE

Filed Oct. 31, 1960  5 Sheets-Sheet 1

INVENTOR.
John Muhr
BY Dybvig & Dybvig
His Attorneys

May 7, 1963 J. MUHR 3,088,475
CAMPING DEVICE
Filed Oct. 31, 1960 5 Sheets-Sheet 2

INVENTOR.
John Muhr
BY Dybvig & Dybvig
His Attorneys

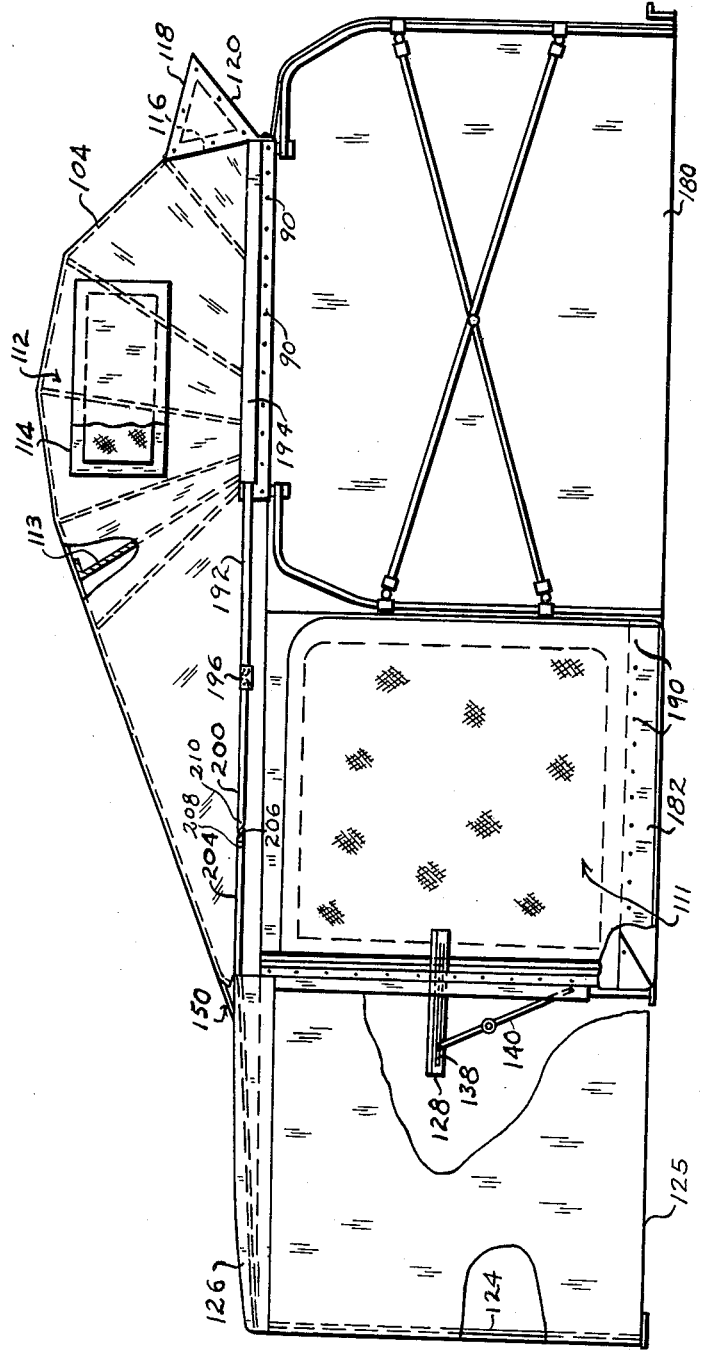

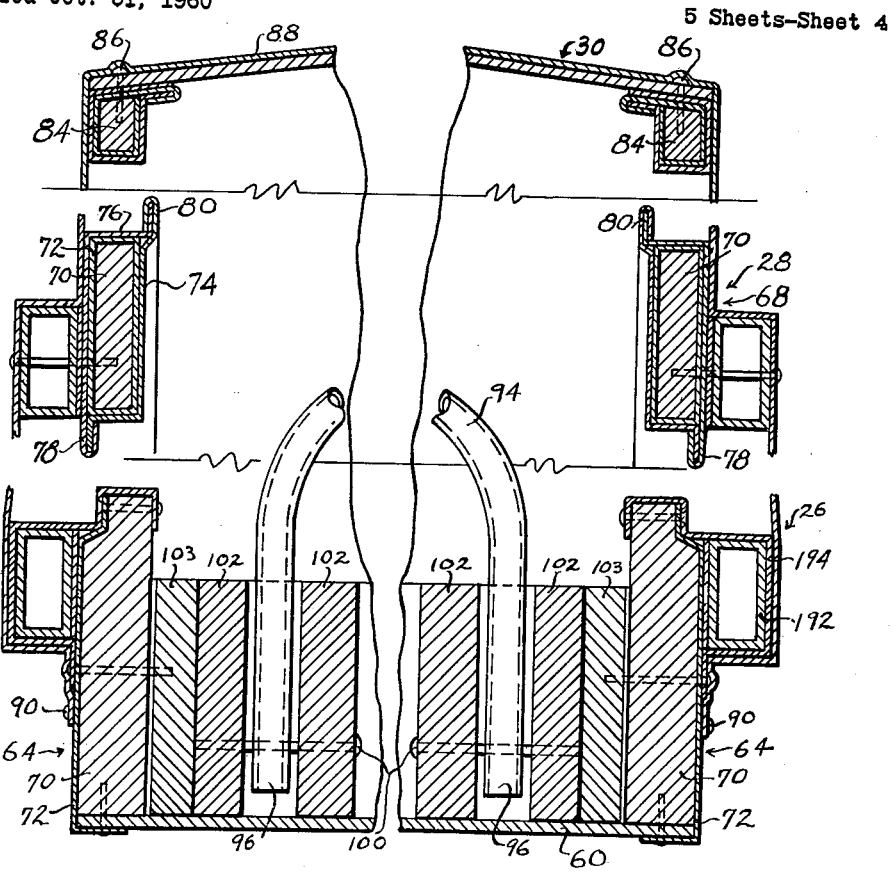
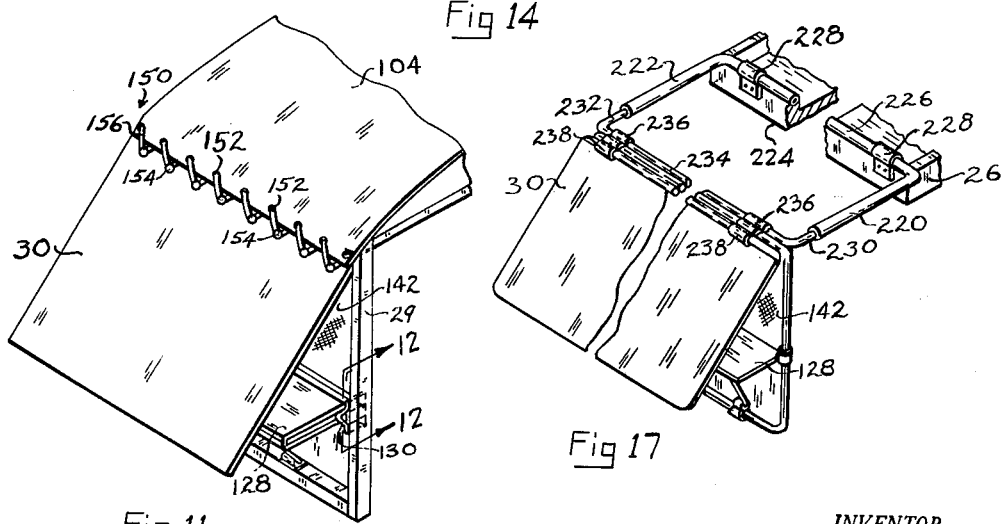

May 7, 1963
J. MUHR
3,088,475
CAMPING DEVICE
Filed Oct. 31, 1960
5 Sheets-Sheet 5
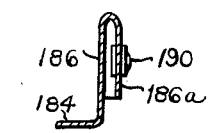
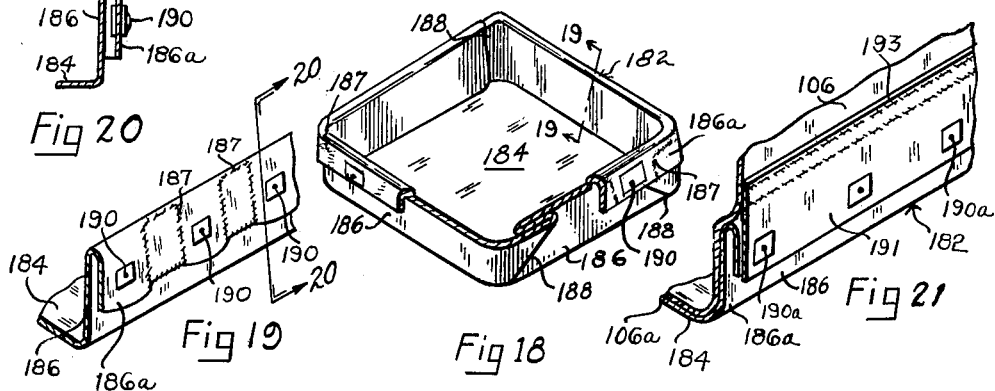
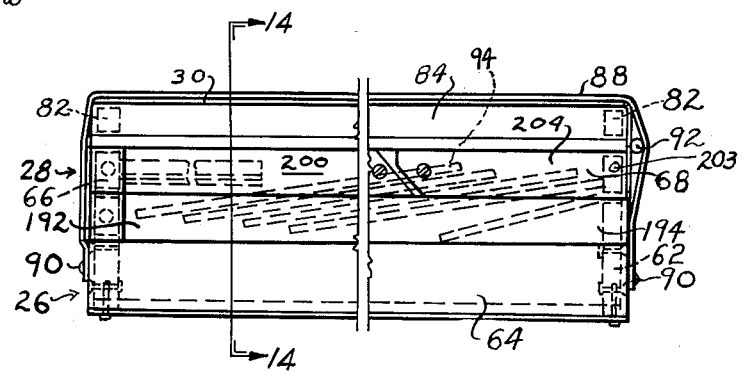
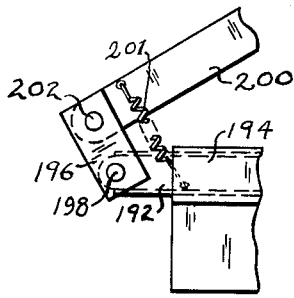
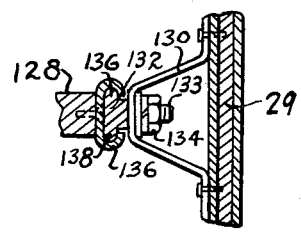
INVENTOR.
John Muhr
BY Dybvig & Dybvig
His Attorneys

United States Patent Office 3,088,475
Patented May 7, 1963

3,088,475
CAMPING DEVICE
John Muhr, 650 SW. 62nd Court, Miami, Fla.
Filed Oct. 31, 1960, Ser. No. 66,129
9 Claims. (Cl. 135—1)

This invention relates to a portable camping device and more particularly to a camping device which may be carried on top of an automobile.

Various attempts have been made to provide camping equipment to be used in association with an automobile or a trailer towed by an automobile. However, with many of these a considerable amount of labor is required in pitching the camping equipment in readiness for use. Some have found that it requires two or more hours before everything is in readiness for use.

An object of this invention is to provide camping equipment mounted on a motor vehicle, wherein the camping equipment may be removed and assembled for use in a matter of a few minutes. This has been accomplished by using a system of link mechanism, such that the link mechanism constituting the frame and the covering, usually canvas or some other suitable material, may be removed and assembled very rapidly and, when breaking camp, it is comparatively easy to fold the equipment into a small compartment without much effort and difficulty, the time consumed being on the order of a few minutes.

Another object of this invention is to provide a camping device which may be carried about from place to place on top of an automobile and which provides a plurality of living quarters suitable for camping.

A further object of this invention is to provide a camping device including a box supportable on top of an automobile, portions of which may be removed to form sleeping quarters on top of the automobile and separate living quarters to the side of the automobile.

Briefly, the above objects are accomplished by providing a sectional box structure which is mounted on the top of an automobile. Sections of the box may be removed to serve as the frame for a tent structure. The box contains a folded canopy which may be attached to the edges of the box and unfolded so as to extend over the box and the side of the automobile to provide camping quarters in the box and to the side of the automobile.

Another object of this invention is to provide mechanisms for supporting the camping equipment either on the top of an automobile or separately therefrom.

Further objects reside in the provision of novel portions of the camping device such as a novel table structure and a tent flooring.

Other objects and advantages reside in the construction of parts, the combination thereof, the method of manufacture and the mode of operation, as will become more apparent from the following description.

Referring to the drawings:

FIGURE 9 is an end view of the completely assembled camping device, showing a modified linkage means interconnecting two of the box sections.

FIGURE 11 is a perspective view of one end of the camping device.

FIGURE 12 is a sectional view of a table support forming a part of the camping device, taken along lines 12—12 of FIGURE 11.

FIGURE 13 is an end view of the folded box structure, in which the modified mechanism for interconnecting the box sections of FIGURE 9 is illustrated.

FIGURE 14 is an exploded sectional view of the box structure, taken along lines 14—14 of FIGURE 13.

FIGURES 15 and 16 show in greater detail portions of the modified linkage of FIGURE 9.

FIGURE 17 shows a further modification of the box structure and linkage connecting sections thereof.

FIGURE 18 discloses a perspective view of a plastic base used as flooring structure for a tent, which base is water-tight.

FIGURE 19 is an enlarged detail view, taken substantially on the line 19—19 of FIGURE 18.

FIGURE 20 is a cross sectional view taken substantially on the line 20—20 of FIGURE 19.

FIGURE 21 discloses a cross sectional view of the flooring structure and the lower portion of the tent.

Figure 1:
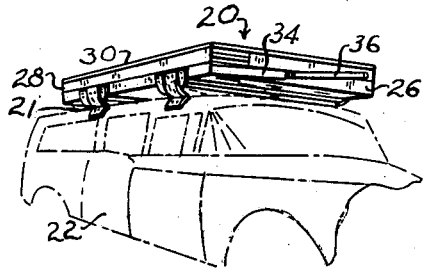
FIGURE 1 is a perspective view showing a sectional box structure made in accordance with this invention mounted on top of an automobile.
Figure 16:
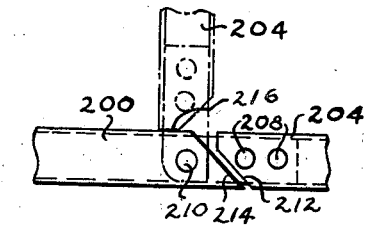

As shown in FIGURE 1, a camping device made in accordance with this invention comprises a rectangular structure 20 which may be supported on an automobile 22 by means of conventional support legs 24. The box 20 is made in three sections, a lower box section 26, an upper box section 28 and a lid section 30. The peripheries of each of the sections 26, 28 and 30 are mutually congruent so that, as shown in FIGURE 1, the three sections nest on top of one another. The lower section 26 is attached to the upper section 28 by a pair of linkages 32 mounted on the front and back ends of the box structure. Each linkage 32 comprises a pair of arms 34, 36. The arm 34 is pivotally attached to one side of the lower box section 26, while the arm 36 is attached to the other side of the upper box section 28. The free ends of the arms 34, 36 are pivotally attached one to the other to form a floating pivot. The pivotal connection between the arms 34 and 36 is such that the arms 36 may pivot to no more than 90° upwardly from the FIGURE 1 position to that shown in FIGURE 2. This limited pivotal connection may be accomplished by providing a suitable interlock, such as that shown in FIGURE 16, as will be discussed below in regard to a modified linkage strutcure.

Figure 2:
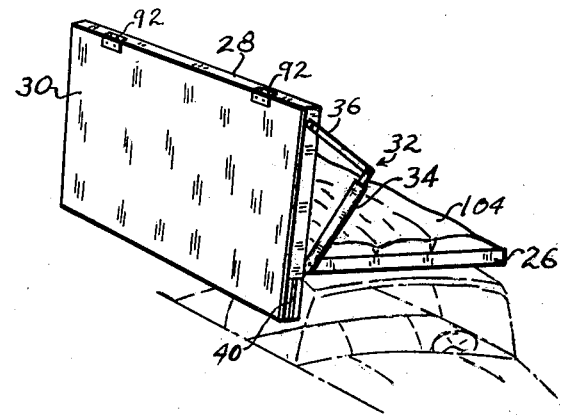
FIGURES 2, 3 and 4 are perspective views illustrating the manner in which the sections of the box are interconnected and removable from the top of the automobile to provide a frame for a camping tent.
Figure 3:
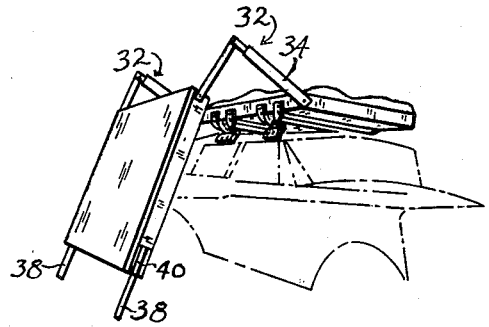
Figure 4:
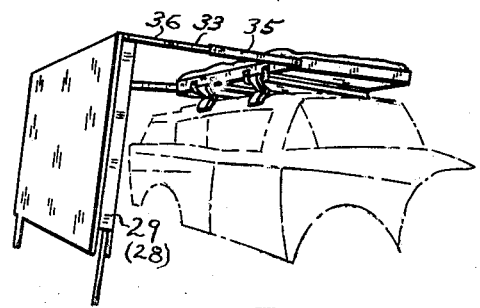

The box sections 26 and 28 are separated to form frame members for a camping tent, as illustrated in FIGURES 2, 3 and 4. The first step is to remove the upper box and lid sections 28 and 30 from the lower section 26 by lifting them upwardly and to the side of the automobile so that the arm 36 occupies a position at substantially right angles to the arm 34. At this point, a pair of legs 38 may be inserted into tubular sockets 40 provided on the front and back ends of the upper section 28. The upper box and lid sections are then lowered and moved sideways simultaneously from the automobile until the legs 38 engage the ground, as shown in FIGURE 3.

The upper box and lid sections 28 and 30 are then moved further sideways from the automobile and placed in a substantially vertical position parallel to the side of the automobile, as shown in FIGURE 4. For convenience, the upper section 28 will hereinafter be termed as a wall 29 when in the vertical position. In this position, it should be noted that the linkages 32 have pivoted approximately 180° from the FIGURE 1 position. If desired, the arms 34 may comprise telescoping sections 33, 35 to permit the upper section 28 to be moved a considerable distance from the lower section 26. The upper section 28 along with the lid 30 may be removed, as shown in FIGURES 2 and 3, by one person.

The box 20 is shown in greater detail in FIGURES 13 and 14. For the moment, it should be observed that the box 20, as shown in FIGURES 13 and 14, employs a modified linkage structure for connecting the upper and lower sections. This linkage structure will be discussed in detail below. The rest of the box structure is the same. The lower section 26 includes a base plate 60 having vertically extending parallel side walls 62 and parallel end walls 64. The upper section 28 likewise has vertically extending parallel side walls 66 and parallel end walls 68. The walls 62, 64, 66 and 68 may be comprised of boards 70 covered by aluminum sheeting 72. Interlocking structural members 74, 76 surround both end walls 68 for providing a downwardly extending external flange 78 and an upwardly extending internal flange 80. The top of the end walls 64 of the lower section 26 are reduced in thickness, so that a transversely extending external groove is provided for receiving the flanges 78. The lid section 30 may be provided with side supports 82 and end supports 84, secured thereto by means of nails or the like, as shown at 86. Again, the end supports 80 are provided with hollow structural members which nest on top of the structural member 76 of the upper section 28 in abutment with the upwardly extending flanges 80. The box, when closed, may be protected by a cover sheet 88, which is snapped onto the box by a plurality of snap fasteners indicated at 90. It is thus seen that the three sections 26, 28 and 30 may be nested one over the other in an interlocking, watertight fashion. A hinge 92 connects the upper section 28 with the lid section 30 and suitable locking means (not shown) are provided for locking each of the sections together.

Figure 7:
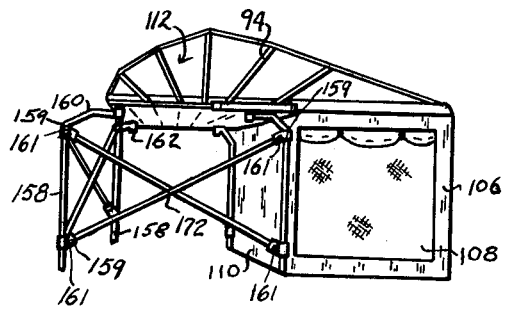
FIGURE 7 is a view similar to FIGURE 6 showing a camping tent supported entirely by the supplementary support.
Figure 5:
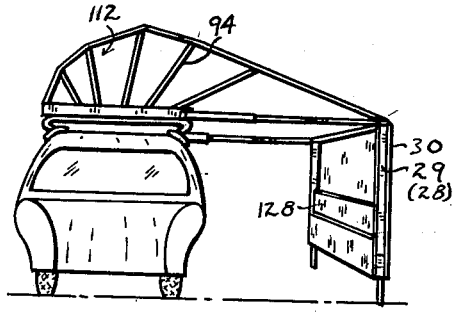
FIGURE 5 is an end view of the automobile and tent frame illustrating the next step in providing a camping tent in which a canopy is unfolded from the box.

As shown in FIGURES 5, 7, 13 and 14, a plurality of U-shaped ribs 94 are pivotally attached at aligned but spaced points to the front and back ends 64 of the lower section 26. As shown most clearly in FIGURE 14, the legs 96 of each rib 94 are each apertured for receiving a pivot pin 100 extending between a pair of parallel rib support boards 102, which are separated from the end walls 64 by spacer boards 103. Since the ribs 94 are attached to spaced points on the end walls 64, they may rest one upon the other in a substantially horizontal position completely within the section 26 as shown in FIGURE 13. The arcuate portion of each rib is attached to a tent cloth or canopy 104 at spaced portions thereof so that, as shown in FIGURES 5 and 7, the ribs may be pivoted upwardly and outwardly. In this position, the canopy 104 extends from the lower box section to the top of the wall 29. When raised, the canopy 104 may be removably attached, as by the snap fasteners 90 (FIGURE 9), to the walls of the lower section 26.

Figure 6:
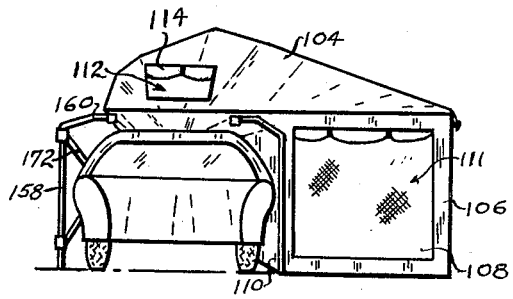
FIGURE 6 is an end view similar to FIGURE 5, further showing a supplementary support for the camping tent.

It is thus seen that the upper section 28 may be moved to the vertical position shown in FIGURE 5 to serve as a wall 29 and that the area between the wall 29 and the side of the automobile may be completely covered by a canopy 104. In this position, the linkages 32 may serve as support rods for sections of tent cloth providing end walls 106. If desired, the walls 106 may be provided with window or door screens 108 as shown in FIGURES 6 and 7. Also a tent cloth 110 may be suspended from opposed points on the support rods so as to hang parallel to the wall 29 and adjacent the automobile, thus providing a completely enclosed sleeping quarter 111. The lower section 26 may be provided with a mattress (not shown) whereby a bed enclosure 112 is provided on top of the automobile. The enclosure 112 may be separated from the quarters 111 by a screen 113 sewed to the canopy 104. For adequate ventilation, a window 114 is provided on the side of enclosure 112 in the canopy 104. In addition, a ventilating opening 116 is provided in one side of the enclosure 112, as shown in FIGURE 9. So that rain cannot enter the opening 116 and thereby dampen the bedding, a foldable awning 118 having an open face 120 is mounted above the opening 116. With this construction, air may enter the enclosure 112 through the openings 116 and 120 while rain is blocked by the top of the awning.

Figure 8:
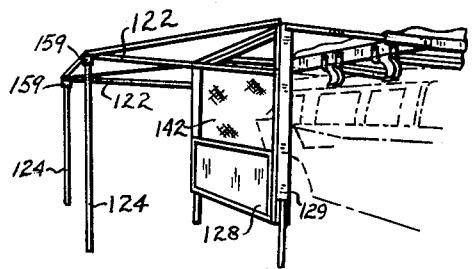
FIGURE 8 is a perspective view illustrating the manner in which the box structure may be expanded to provide additional camping quarters.

The sleeping quarters 111, 112 are sufficient to provide the necessary privacy required when it is desired merely to stop overnight at a camping location. However, a camper often desires to spend a considerable amount of time at one camping area. Accordingly, it has been found desirable to provide an area which is covered to provide protection from sunlight or rain. For such protection, the lid 30 may be pivoted about the hinges 92, FIGURES 2 and 13, to become a substantially horizontal awning as shown in FIGURE 8. The awning is supported by braces 122 and legs 124 extending from the corners thereof. As shown in FIGURE 9, a tent cloth 125 may extend from the upper portion of the wall 29 and around the braces 122 and legs 124. If desired, the entire lid is covered by a suitable plastic cover 126.

The area covered by the lid 30 at its horizontal position has been found especially useful as a cooking area. Accordingly, it has been found desirable to provide a table 128 mounted within the upper section 28 for use in holding cooking utensils. As shown in FIGURE 8, the table is normally carried so that it lies completely within the frame of the wall 29. Mounting brackets 130 (FIGURES 11 and 12), which are attached to the sides of the wall 28, are each provided with a lug 132 pivotally attached to the bracket by means of a screw 133 and a bolt and washer assembly 134. The lugs 132 have bosses 136 which are slidably engaged within channels 138 attached to each side of the table 128. The table may be raised from the position shown in FIGURE 8 to that shown in FIGURES 9 and 11, by raising the bottom of the table, as viewed in FIGURE 8, and thereafter pivoting the table and lug 132 with respect to the brackets 130. When in the horizontal position, the table can be moved in and out of the cooking area into the sleeping quarters 111 by simply moving the channels 138 with respect to the lugs 132. To provide additional support for the table, a pair of folding braces 140 are provided, only one of which is shown in the drawings. A detent or the like is provided for locking the foldable sections of the braces 140 when the table lies in a horizontal position. The upper arms of the braces 140 are slidably received within the channels 138, so that the braces 140 support the table 128 whether it is partially or completely moved into the cooking area. To prevent mosquitoes or other pests from entering the sleeping quarters, a screen 142 is mounted within the frame of wall 29, i.e., upper section 28, above the table. The area beneath the horizontal table may be enclosed by either a solid member or a screen.

The end of the canopy 104 adjacent the wall 29 is removably attached to the lid 30. Since the lid 30 may either lie in a vertical position adjacent the wall 29, as shown in FIGURE 5, or in a horizontal position, as shown in FIGURE 8, it is apparent that, if the canopy 104 were rigidly attached to the lid 30, it would sag as the lid is pivoted from its vertical to its horizontal position. Accordingly, a yielding or resilient attaching means 150, FIGURE 11, is provided to attach the canopy 104 to the lid 30. A plurality of apertures 152 are provided in the canopy 104 while the lid 30 is provided with a plurality of studs 154. The studs 154 may be either simple hooks or pulley wheels. An elastic cord 156 is coursed sinuously through each of the apertures 152 around the studs 154. With this construction, a strong elastic cord has been found sufficient to retain the canopy taut regardless of the position of the lid 30.

With the device thus described, one may carry a camping tent in its folded condition on the top of an automobile as shown in FIGURE 1. Suitable camping quarters are provided for sleeping on the top of the automobile and to the side of the automobile. Further, an additional covered area is provided under the lid 30 for use as a cooking area or as a porch where the campers may be shielded from sunlight or rain. The entire unit, including a mattress for the bed on top of the automobile, the canopy and its supporting ribs, the frame for the sleeping quarters and the lid, form a part of or are enclosed in the box structure. Only a fraction of a hour is required to assemble the camping unit as it is shown in FIGURE 9 or disassemble the unit to replace it as a box, as shown in FIGURE 1.

Figure 10:
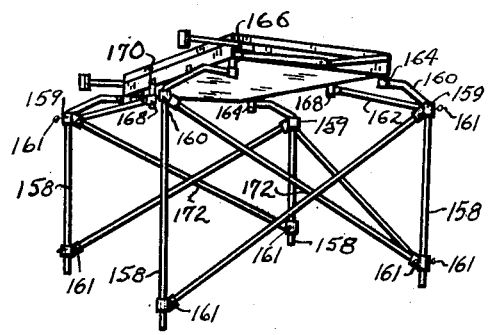
FIGURE 10 is a perspective view illustrating how the camping device may be disassembled and folded back into the box structure mounted upon the supplementary mounting mechanism.

While the use of an automobile as a support is most satisfactory, it is not always adequate. Oftentimes when the camping unit is assembled, as shown in FIGURE 9, it is desired to leave the camping unit and drive away from the camping site. Also, it may be injurious to the top of the automobile if it is the sole support for the sleeping enclosure 112 over prolonged periods of time. Accordingly, supplementary supporting means are provided for the box structure, as shown most clearly in FIGURES 7 and 10. The supplementary supporting means comprises four corner posts 158 seated in sockets 159 and secured in position by pins 161. The upper portions of the posts 158 are curved, as shown at 160, so that the posts may be mounted to straddle the sides of the supporting automobile. Two of the posts are provided with inwardly extending arms 162 for supporting the opposed central portions of the box 20. Each corner post has sleeves 164 for receiving studs 166 extending vertically downwardly from the bottom of the box. Likewise, the ends of the rods 162 may also be provided with sleeves 168 for receiving studs 170. Of course, the supporting posts 158 and the arms 162 may be attached to the lower box section 26 by any other suitable device. For example, the posts could be attached to the bottom of the lower box section 26 by means of bolts. The corner posts 158 are first attached to the lower box section 26 when the automobile supports the box, as shown in FIGURE 6. Cross braces 172 are provided at one end of the automobile and along the left side (FIGURE 6) of the automobile. The automobile is then driven from beneath the box 20, as indicated in FIGURE 7. Another set of cross braces 172 are positioned over the other end of the box, as shown in FIGURE 10. With the three cross braces 172 in position, the supplementary supporting posts 158 have been found sufficient to support the lower section 26 when used as a bed and further, as shown in FIGURE 10, to support the entire camping device when folded for storage. Aside from its support function, an additional benefit gained by the use of the supporting posts 158 is that further sleeping quarters may be obtained by snapping a tent cloth 180 onto the lower section 26 to enclose the area normally occupied by the automobile. A door or curtain (not shown) may be provided in the tent cloth 110 to furnish communication between the sleeping quarters 111 and the sleeping quarters underneath the lower box section 26.

It is thus apparent that the camping device provided by this invention is extremely flexible. Either two or three sleeping quarters may be provided in addition to a sheltered area used as a porch or for cooking. Normally, there is a considerable amount of traffic in the area used as a porch or for cooking, which renders a floor for that area impractical, since any floor would get too dirty. However, it is desirable to provide a flooring for the sleeping quarters 111. While any conventional tent flooring device could be utilized, the flooring structure 182, shown in FIGURE 18, has been found highly successful.

As shown therein, the flooring structure comprises a rectangular plastic floor base 184 and four side sections 186 which are integral with the base and which extend normally from the edges thereof. The adjacent sides 186 are folded at 188 to provide a water-tight base 184. The upper margins of the walls 186 are provided with an overhanging flange or fold 186a. Snap fasteners 190 are arranged at spaced intervals in the flange 186a, as best shown in FIGURE 19. In order to keep the flange 186 from raising upwardly and unfolding, the flange 186a is sewed or cemented at 187 to the outer side of the walls 186, so as to hold the flange portion 186a in a folded relation.

The tent wall 106 may be provided with a bottom portion 106a fitting within the floor structure 182. A flange or flap 191 is secured to the wall 106 by a seam 193 and is provided with complementary snap fasteners 190a, the flange or flap 191 overlying the flange 186a, so that as it rains, the bottom flooring structure 182, being water-tight, prevents the bottom of the tent from getting wet and keeps water out of the bottom of the tent. The flange or flap 191 secures the flooring structure 182 to the tent and keeps rain from running in between the tent wall and the flooring structure 182. The entire flooring structure 182 may be folded for easy portability. Such a structure has been provided in the sleeping quarters 111 in FIGURE 9. The flooring structure 182 has proved highly practical. The sides 186 keep out rain and mud, so that the floors stay relatively clean. When dirty, the floor may simply be removed and cleaned out in a minimum amount of time, since it is easily assembled and disassembled.

While one form of linkage mechanism has been described with reference to FIGURES 1 through 8, it is, of course, obvious that many linkage mechanisms would be suitable. A second possible type of linkage mechanism is shown most clearly in FIGURES 13 and 14 and is the form of linkage illustrated in the completed camping assembly of FIGURE 9. In this embodiment, a pair of linkages are again mounted one on each end of the box 20 to attach the upper section 28 to the lower section 26. In this case, however, each linkage comprises an arm 192 telescopically received within a channel 194 mounted on the sides or within the lower box section 26. A U-shaped bracket 196 is pivotally attached to the arm 192 by means of a pivot pin 198. This arrangement is shown best in FIGURE 15. A second arm 200 is also attached to the bracket by means of a second pin 202. The channel 194 is connected to the arm 200 by a spring 201. This spring, when the arm 200 and the channel 194 are aligned, holds the arms in this aligned position. This has been accomplished by an off-center position of the spring 201. A third arm 204 is pivotally attached to the second arm 200 in much the same manner as the arm 36 is attached to the arm 34, so that the third arm 204 may pivot to a position wherein it extends at an angle of 90° with respect to the second arm 200. As shown in FIGURE 9, the other end of the third arm 204 is pivotally attached to the right side of the upper section 28, shown as a wall 29. The third arm 204 is connected to the upper section 28 by a pivot 203, shown in FIGURE 13. The arms 200 and 204 are interconnected by means of a flange 206 rigidly attached internally of the arm 204 by means of bolts 208. The flange 206 extends internally into the second arm 200, to which it is pivotally attached by means of a pin 210. The arms 200 and 204 have opposed parallel slanting faces 212, 214, respectively, preventing the arm 204 from pivoting in a clockwise direction, as viewed in FIGURE 16, about the pivot pin 210. A stop surface 216, extending normally to the side of the arm 204, limits counterclockwise pivotal movement of the arm 204 about the pin 210 from the full line position shown in FIGURE 16 to that shown in dotted lines, wherein the stop surface 216 engages the top side of the arm 200.

The linkage mechanism illustrated in FIGURES 9, 13, 14 and 15 is used in substantially the same way as the linkage mechanism described earlier. Initially, the upper section 28 is raised, so as to pivot the third arms 204 to a right angle with respect to the arms 200. The spring 201 aids in folding the channel 194 and arm 200. While the upper and lid sections are being lowered, they are moved away from the lower section 26, so that the telescoping arms 192 are removed from their channels 194, as illustrated in FIGURE 15. Again, it may be desirable to include a spring, such as the counterbalance spring 201 illustrated in FIGURE 15, which would fit in cooperating apertures (not shown) in the arms 200 and 204 when each arm 204 is in its right angle (dotted) position shown in FIGURE 16. The linkage means just described has an advantage in that the linkages may be extended so that the wall 29 is further away from the automobile, thus rendering the sleeping quarters 111 larger than those available with the linkage mechanism shown in FIGURE 2.

Another structure for achieving substantially the same result is shown in FIGURE 17. Here the lower section 26 is connected to the upper section 28 by means of a pair of arms 220, 222 hinged to the lift side 224 of the lower box section 26, rather than to the ends of the lower section as in the previous example. The two arms 220, 222 may be integrally connected with a connecting arm 226 rotatably mounted in a pair of sleeves 228 provided on the top of the side 224. A second pair of arms 230, 232 are telescopically received within the arms 220, 222, respectively, again to provide extra room for the sleeping quarters. The arms 230, 232 may likewise be connected by a connecting arm 234 which is pivotally mounted to the side of the upper section 28 by means of hinges diagrammatically illustrated at 236. A lid 30, of course, is hinged to the same side of the upper section 28 by similar hinge members 238. The linkages interconnecting the sections 26 and 28, the periphery of the upper box section 28 and of the lid 30 may be made of similar tubular materials. When the upper box and lid sections 28 and 30 are replaced on top of the lower section 26, the arms 220, 222 lie between the lower section and the upper section 28 and in effect form still another section of the box structure.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a camping device, the combination comprising a box having upper and lower sections, means for supporting the box on top of an automobile, linkage means adjacent said sections interconnecting them, a lid for said box attached to said upper section, the upper section and lid being movable to a vertical position spaced from the lower section wherein the linkage means extends horizontally from the top of the upper section to the lower section, a canopy, a plurality of U-shaped ribs attached to spaced points on said canopy, the legs of said ribs being pivotally attached to opposite ends of the lower section, each of said ribs being attached to said lower section at a point laterally displaced from the points of attachment of the remaining ribs, whereby the ribs may be nested to lie in a nearly horizontal position completely within the lower section or pivoted to extend angularly upwardly from the lower section whereby the canopy extends over the lower section to the vertically positioned upper section.

2. The combination of claim 1 in which said lid may be pivoted to a substantially horizontal position and means are provided for retaining said lid in the horizontal position.

3. The combination of claim 2 wherein resilient means are provided for attaching said canopy to said lid, whereby said canopy is taut when said lid is either in a vertical position adjacent said upper section or in the substantially horizontal position.

4. The combination of claim 3 in which the canopy is provided with a plurality of openings and said lid is provided with a plurality of studs, and in which said resilient means comprises an elastic cord coursed sinuously through said openings and around said studs.

5. The combination of claim 2 in which a table is mounted within said upper section, said table being pivotal from a position in which its face extends vertically to a position in which its face extends horizontally.

6. The combination of claim 1 in which a tent cloth is provided for enclosing the area between the sides of the supporting automobile and the vertically positioned upper section, said tent cloth being supported by the horizontally extending linkages.

7. In a camping device, the combination comprising a box adapted to be removably supported on top of an automobile, said box having upper and lower sections; a pair of linkages adjacent opposite ends of said sections interconnecting them; the upper section being movable to a vertical position spaced from the lower section wherein the pair of linkages extends horizontally from the top of the upper section to the lower section; each of said linkages comprising an arm pivotally attached to one side of said lower section; and a second arm pivotally attached to said first mentioned arm and to the other side of said upper section.

8. In a camping device, the combination comprising a box adapted to be removably supported on top of an automobile, said box having upper and lower sections; a pair of linkages adjacent opposite ends of said sections interconnecting them; the upper section being movable to a vertical position spaced from the lower section wherein the pair of linkages extends horizontally from the top of the upper section to the lower section; each of said linkages comprising an arm slidably mounted within said lower box section, a second arm movable from a position in which said second arm overlies the first mentioned arm to a position wherein said second arm extends colinearly with said first arm, means interconnecting said arms, and a third arm pivotally attached to said upper section and to said second arm.

9. In a camping device, the combination comprising a box adapted to be removably supported on top of an automobile, said box having upper and lower sections; linkage means adjacent said sections interconnecting them; the upper section being movable to a vertical position spaced from the lower section wherein the linkages extend horizontally from the top of the upper section to the lower section; said linkage means comprising a pair of arms, hinge means connecting one end of said arms to said lower section, hinge means connecting the other end of said arms to said upper section, whereby said arms lie between said upper and lower sections when said upper section overlies said lower section.

References Cited in the file of this patent

UNITED STATES PATENTS

| | | |
|---|---|---|
| 1,508,065 | Ramsdell | Sept. 9, 1924 |
| 1,650,323 | Byars | Nov. 22, 1927 |
| 2,804,083 | Wieber | Aug. 27, 1957 |
| 2,848,007 | Churchill | Aug. 19, 1958 |
| 2,907,077 | Pugsley | Oct. 6, 1959 |
| 2,930,051 | Kampmeier | Mar. 29, 1960 |
| 2,963,078 | Ferrelle | Dec. 6, 1960 |